United States Patent [19]
Ulmer

[11] 3,915,368
[45] Oct. 28, 1975

[54] BUTT-WELDING MACHINE FOR CONNECTING THE ENDS OF BANDS

[75] Inventor: Klaus Ulmer, Dortmund, Germany

[73] Assignee: Hugo Miebach GmbH, Dortmund, Germany

[22] Filed: Aug. 15, 1974

[21] Appl. No.: 497,835

[30] Foreign Application Priority Data
Aug. 16, 1973 Germany............................ 2341255

[52] U.S. Cl. ................. 228/13; 228/44.1; 228/212; 228/213
[51] Int. Cl.² ...................... B23K 5/22; B23K 28/02
[58] Field of Search ........... 228/5, 6, 13, 15, 19, 44, 228/4, 212, 213; 29/493, 464

[56] References Cited
UNITED STATES PATENTS

| | | | |
|---|---|---|---|
| 2,120,316 | 6/1938 | Stone | 228/5 |
| 2,219,049 | 10/1940 | McArthur | 228/4 |
| 3,647,131 | 3/1972 | Hahne | 228/6 X |
| 3,771,215 | 11/1973 | Williams | 228/5 X |

*Primary Examiner*—Al Lawrence Smith
*Assistant Examiner*—Margaret Joyce

[57] ABSTRACT

A flash-butt welding machine for connecting the ends of strips following one another includes a stationary clamping frame and an upset platen arranged ahead of the clamping frame and movable in the direction of band travel. Arrangements are provided for transfer of the bands, for lateral centering of the bands, for gripping the centered bands to hold them stationary, for cutting the bands, for moving the centered and cut bands against each other, for welding the bands together and for removing the weld bulge or flash.

On the clamping frame and the upset platen, between the arrangements for transfer of the bands and the gripping devices, a squaring shear for each of the bands is arranged, one of the squaring shears being mounted on the upset platen.

10 Claims, 14 Drawing Figures

BUTT-WELDING MACHINE FOR CONNECTING THE ENDS OF BANDS

BACKGROUND OF THE INVENTION

1. Field of the Invention

The invention relates to a flash-butt welding machine for connecting the ends of bands following each other which includes a stationary clamping frame and an upset platen arranged for movement in the direction of movement of the band ahead of the clamping frame, with arrangements for lateral centering of the bands, for holding the centered bands, for trimming the bands, for positioning the centered and trimmed bands together, for welding the bands together and for removal of the weld bulge.

2. The Prior Art

In connection with continuous operation for the manufacture of metal bands, a traveling band is connected with the following band through welding together, especially butt-welding, of the band ends. For this purpose, the bands are aligned, the band ends cut and the cut band ends led into the gripping jaws of a welding machine, where they are put under pressure and welded together.

The strength of the weld joint depends on the quality of the weld seam. A trouble-free weld seam requires that the transverse edges of the bands to be welded together should be at right angles and that the necessary pressure on the band ends be maintained.

Heretofore in front of the weld machine on the infeed side a shear for the outgoing and for the succeeding ends of the band has been arranged, by which the band end are cut after previously undergoing lateral centering. In consequence of the subsequent movement of the bands into the welding position, the maintenance of the transverse position of the bands or the weld edges with relation to one another and the maintenance of the necessary pressure on the band ends is not assured, which leads as a consequence to poor weld seams and resulting manufacturing difficulties as a consequence of cracks.

It has been proposed to provide in a cutting area lying between clamping frames a cutting arrangement for simultaneously cutting the bands which have been transported into the cutting area and laterally centered, and to move the cut bands under pressure into the welding position (DT-OS2,163,014). This proposal however does not provide a satisfactory solution of the problem, because by the arrangement of the cutting devices for the welding machine between the clamping frames the removal of the cut-off band ends presents difficulties and the cutting arrangement interferes in an undesirable way with the operation of the welding arc. The removal of the cutting arrangement after the consequent cutting of the bands into a position near the bands, which is a necessity for carrying out the welding step, requires then additional time for production.

SUMMARY OF THE INVENTION

The invention has the purpose of solving the foregoing problem without difficulties.

This purpose according to the invention, in a flash-butt-welding machine of the previously described type, is solved, in that squaring shears for each of the band ends are associated with both the clamping frame and the upset platen arranged between the band transfer arrangements and the gripping blocks.

The arrangement according to the invention of squaring shears for the clamping frame and the upset platen as integral structural parts of the welding machine outside the welding area presents the possibility of undisturbed removal of the cut-off band ends and avoids a fouling of the cutting arrangements by the welding arc. This further results in an economical and faster mode of operation.

Besides, the arrangement according to the invention in an advantageous way allows the lateral centering arrangements to be positioned in the direct neighborhood of the shears so that the centering of the bands and the positioning of the squared cuts at right angles are more surely achieved.

Stops for the bands provide a limit of the length of the band ends to be cut off. In the simplest case, the stops are constituted by the gripping jaws when they are brought together. In a modified form, the tops are constituted by a section of the guide rollers for the bands which are swingable into a vertical position. From the movement of the guide roll section into the stop position there results also the opening of the discharge chute for the cut-off band ends which is positioned beneath the roll section. This separate arrangement reduces to a certain degree the working cycle of the welding clamping jaws, which within this period can be combined with a cleaning arrangement.

Whereas with smaller bands the knife for the removal of the welding flash can be positioned between the pairs of clamping jaws, with wider bands, especially bands wider than 500 mm, for structural reasons this is no longer possible. In a further modification of the invention therefore, the knives are arranged with respect to the clamping frame between the gripping jaws which form a part of the clamping frame and the squaring shear. Thus the necessary assurance is obtained that the knife is applied at the earliest possible point of time while the flash is still hot.

The use of guillotine shears is advantageous, because they have very small space and time requirements. Shears releasable from the upsetting slide and clamping frame facilitate the exchange of knives. It is advantageous to use upwardly detachable shears, because on the one hand the smallest working area is required and besides such a construction does not affect the stability of the welding machine.

BRIEF DESCRIPTION OF THE DRAWINGS

In the drawings the invention is further explained. In these.

DESCRIPTION OF THE PREFERRED EMBODIMENTS

Figure 1A:
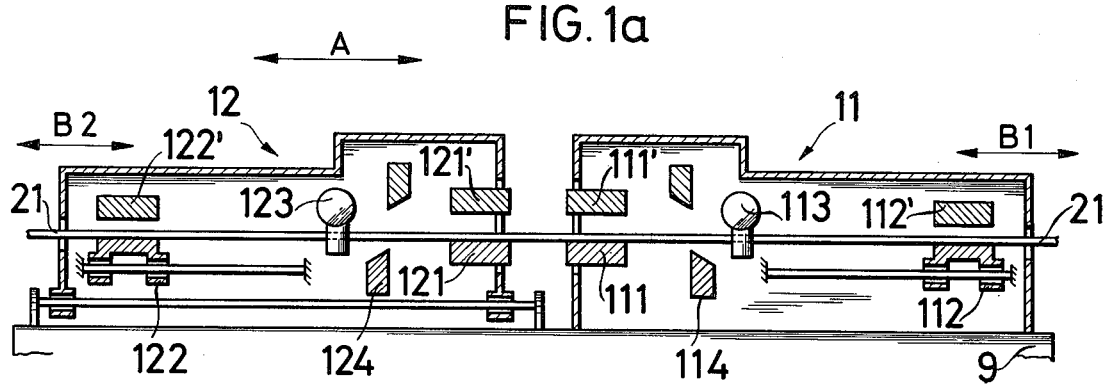
FIGS. 1a to 1g show the working cycle in one modification of a welding machine for a band.

The welding machine in FIG. 1 consists in general of a machine stand 9 having at the outlet side a stationary clamping frame 11 with gripping jaws 111, 111' and, on the inlet side, opposite the clamping frame 11, an upset platen 12 movable in the direction of the double arrow A with gripping jaws 121, 121'. The upset platen is movable by a conventional cylinder and piston arrangement, not shown. Each of the machine parts 11 and 12 is provided with a band transporting arrangement 112, 112' or 122, 122' movable in the direction of the double arrows B1 and B2, and also a band edge centering device 113 or 123 movable against the edges of the band and a squaring shear 114 or 124. The knife 116 for removal of the welding flash 213 (FIG. 1g) is positioned between the gripping jaws 111, 111' and 121, 121', which are movably mounted on the upset platen and clamping frame, respectively, and are actuated by conventional cylinder and piston arrangements, not shown. All of these elements are of conventional types and known constructions and are not described in detail.

The cycle of operation of this machine is as follows:

At first all the work tools are out of engagement with the traveling bands 21.

If the band 21 has moved through the welding stations 121, 121' and 111, 111', the gripping jaws 121, 121' as well as 111, 111' are moved together, before the following band 21' has entered the welding station 121 up to 111'. Then the two band ends 211, 211' with the help of driving arrangements (not shown), such as feel rolls journalled on the machine on the inlet and outlet sides, are moved against the individual oppositely positioned stops formed by the jaws 121, 121' and 111, 111', which are engaged with one another, and with the help of conventional piston and cylinder arrangements (not shown) loops 212', 212 are formed (FIG. 1b) which make possible a longitudinal and transverse movement of the band ends 211 and 211' during lateral centering with the help of the centering arrangements 123 and 113. After the lateral centering, the bands 121' and 121 are clamped in the band transfer arrangements 122 or 112 (FIG. 1c), the perpendicularly directed welding edges are produced by cutting of the band ends 211' and 211 with the help of the squaring shears 124 or 114 (FIG. 1d) and the centered, tensioned bands 21, 21' in the grip of the band loops 212 and 212' are shifted through the band gripping jaws 121, 121' or 111, 111' which have meanwhile been opened while maintaining the perpendicular direction of the cutting edges are moved into the welding position (FIG. 1e). Finally the gripping jaws 121, 121' as well as 111, and 111' grip the bands 21 and 21' under pressure by moving together (FIG. 1f), the welding current is turned on and the upset platen 12 is moved towards the clamping frame 11. The flash bulge 213 at the weld seam is then removed in the welding position with the help of the knife 116.

Figure 1B:
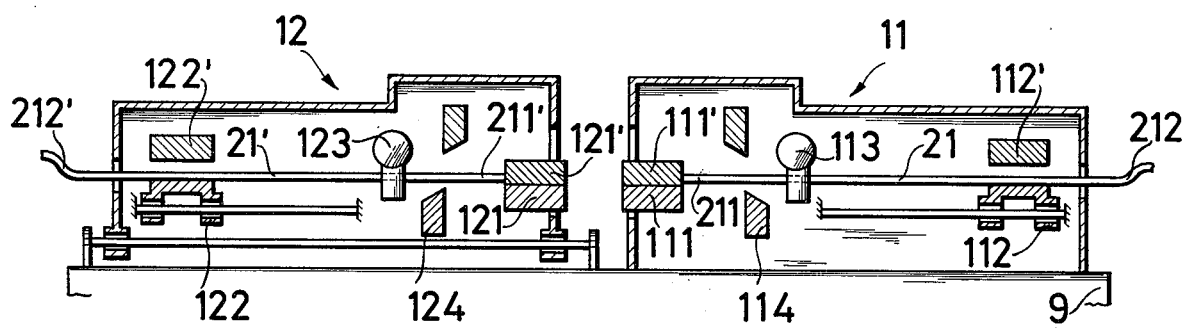
Figure 1C:
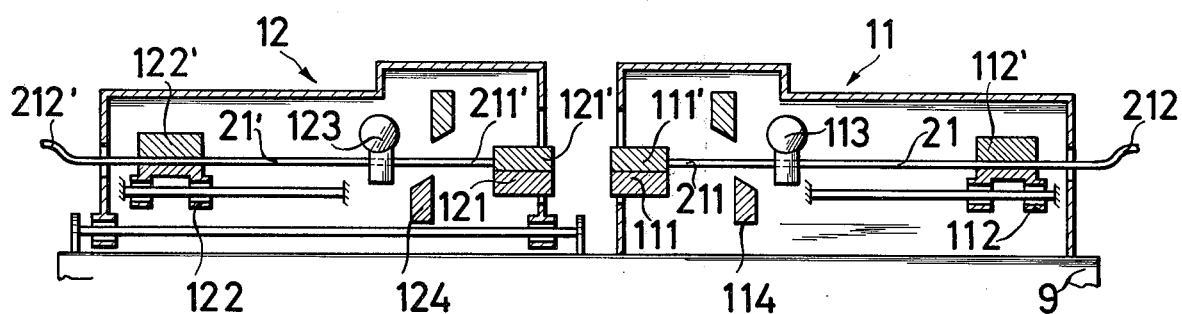
Figure 1D:
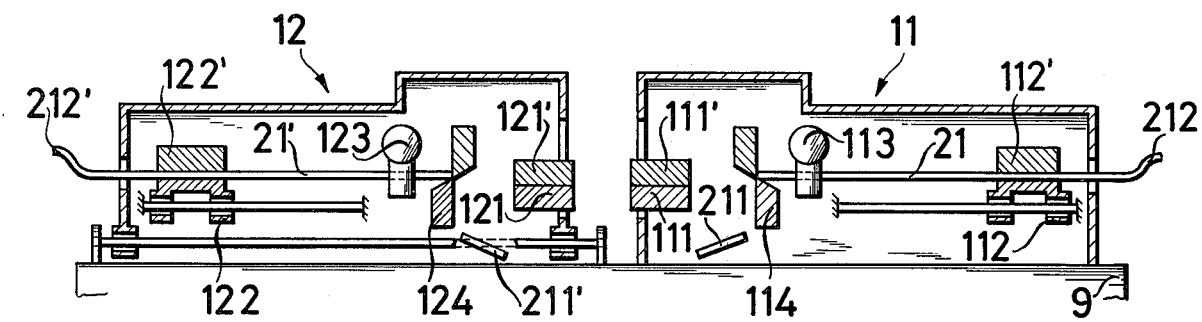
Figure 1E:
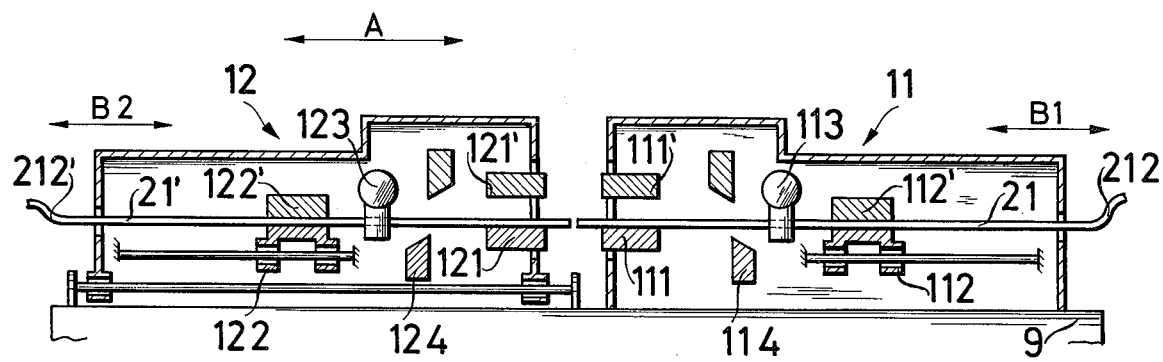
Figure 1F:
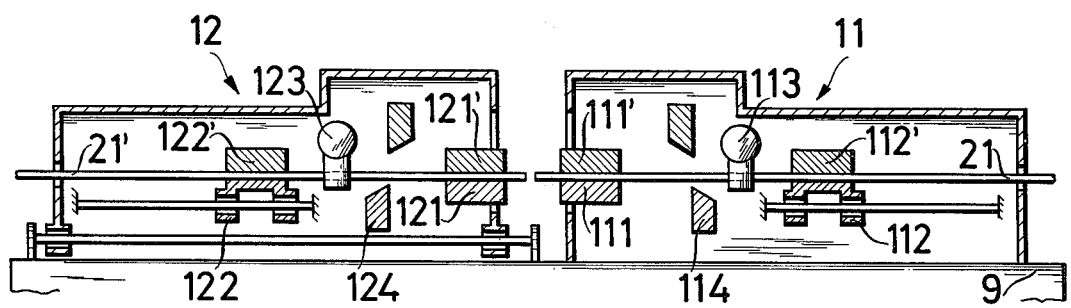
Figure 1G:
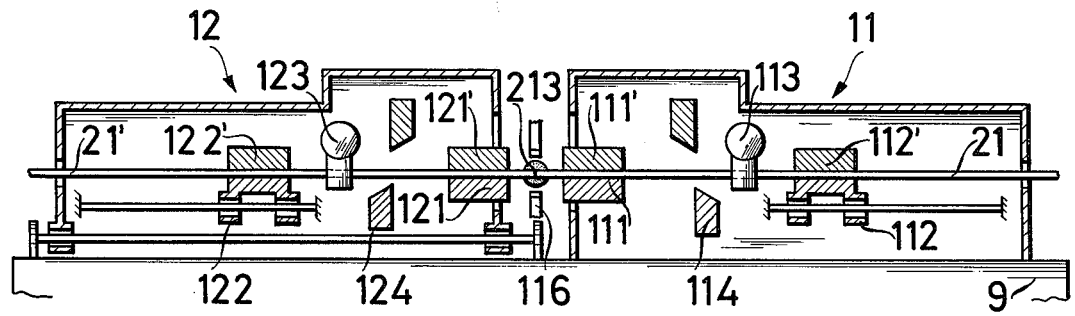

In general, the horizontal line through the machine in FIG. 1a represents merely the path of the bands. With the gripping jaws 121, 121' and 111, 111' closed, as shown in FIG. 1b, the loops 212, 212' are formed and the bands are pushed in until they abut against the closed sets of jaws. Thereafter, they are clamped in the jaws 122, 122' and 112, 112', (FIG. 1c) and the ends 211, 211' are cut off (FIG. 1d) and fall out of the machine. The transfer clamps 122, 122' and 112, 112' are then moved inwardly towards each other, to bring the ends of the bands into substantially abutting position (FIG. 1e), whereafter the jaws 121, 121' and 111, 111' are again clamped and the upset platen 12, with the jaws 121, 121' and 122, 122' is moved towards the clamping frame 11, thus bringing the ends of the bands together under pressure, and a welding current is turned on to form the seam, after which the bulge is removed.

In FIG. 1, in this way, clamping jaws 121, 121' and 111, 111' in their closed position also constitutes stop means for limiting the movement of the bands before the ends are cut off.

In a machine according to FIG. 2, there are automatic stops 127 and 117 for the bands 21' and 21 between the gripping jaws 121, 121' and 111, 111' and the shears 124 and 114. These stops are constructed through a vertically swingable section of the supporting rollers for the band 21, not otherwise shown. Beneath this roller section are shown in dotted lines the escape chutes 127 and 117 for the cut-off band ends 211' and 211. Also the knife 116' for the removal of the flash 213 is arranged in the clamping frame 11 between the gripping jaws 111 and 111' and the squaring shear 114, which for this purpose is provided with an edge notcher 118 for removing the projection formed at the band edges in the flowing of the flash 213. Finally a cleaning arrangement 119 for the clamping jaws 121, 121' or 111, 111' is provided.

Figure 2A:
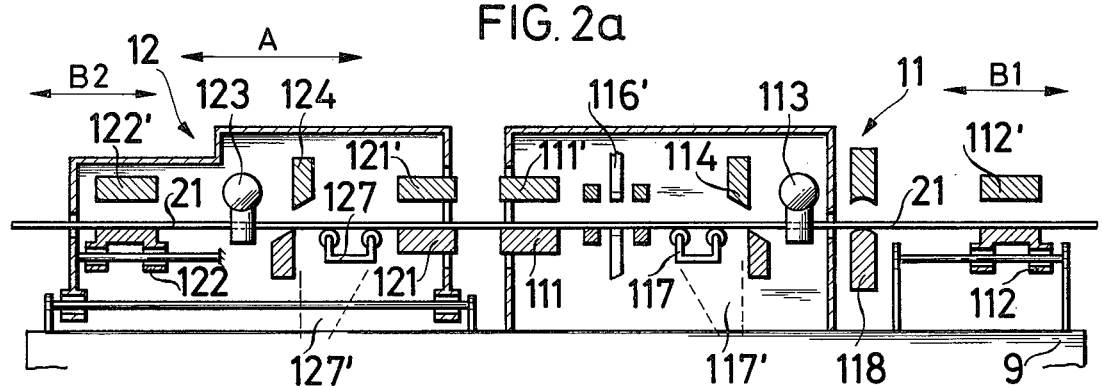
FIGS. 2a to 2g show the working cycle in a modified form of welding machine for a wide band.
Figure 2B:
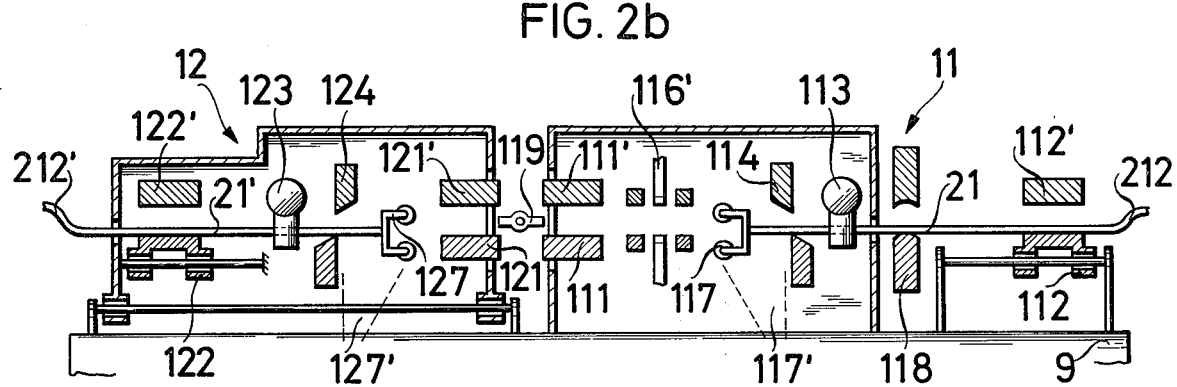
Figure 2C:
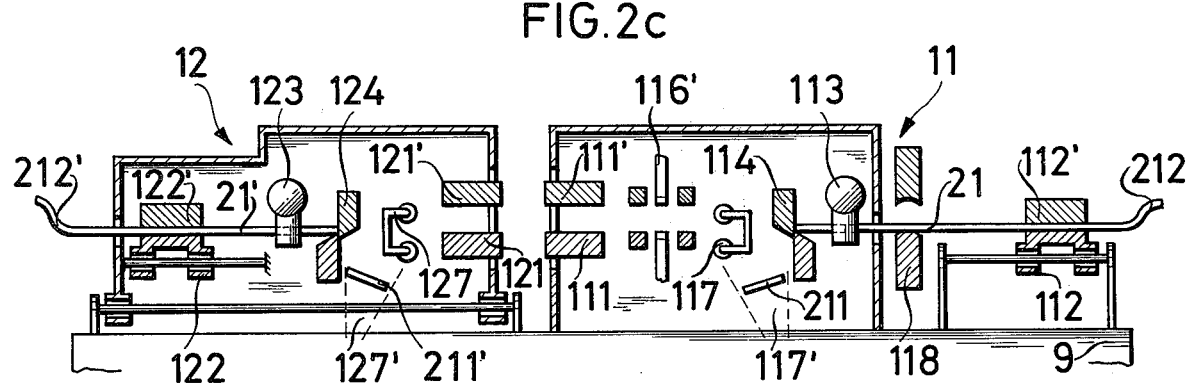
Figure 2D:
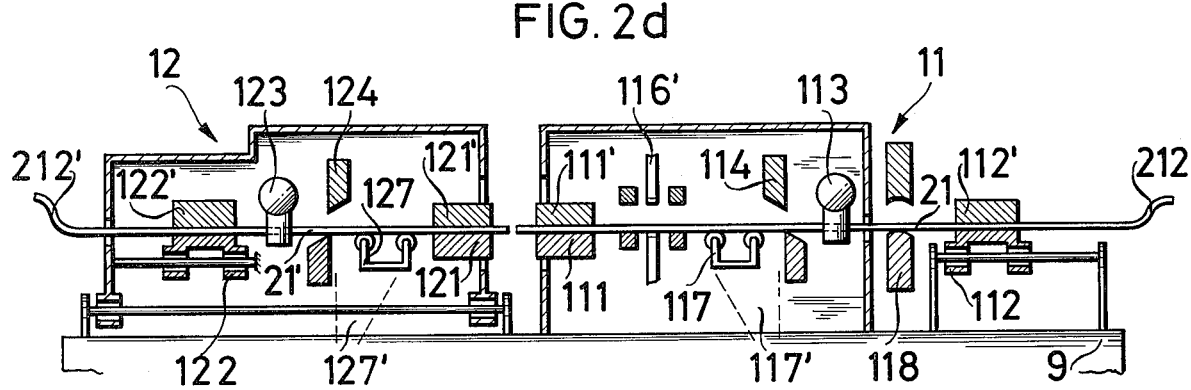
Figure 2E:
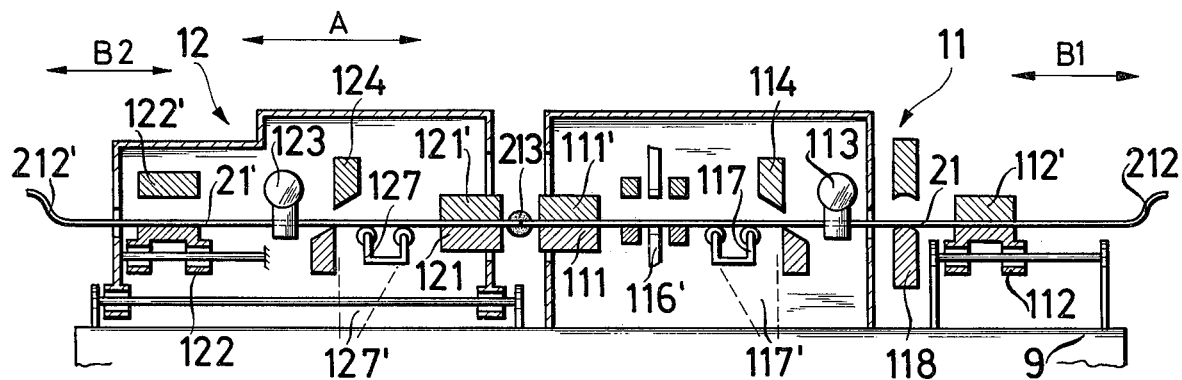
Figure 2F:
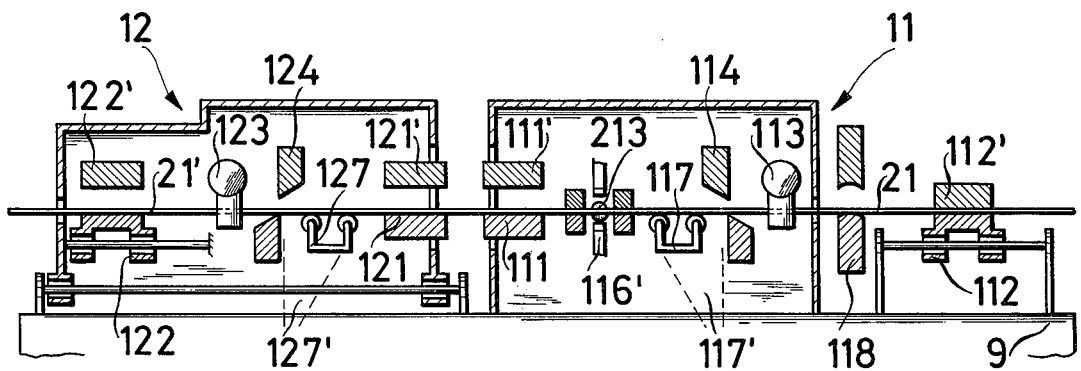

In this machine, because the automatic stops 127, 117 are provided, one operating step in the cycle of the clamping jaws 122, 122' as well as 112, 112' is omitted. In this space of time, the cleaning of the gripping jaws is accomplished with the help of the cleaning arrangement 119 (FIG. 2b).

Figure 2G:
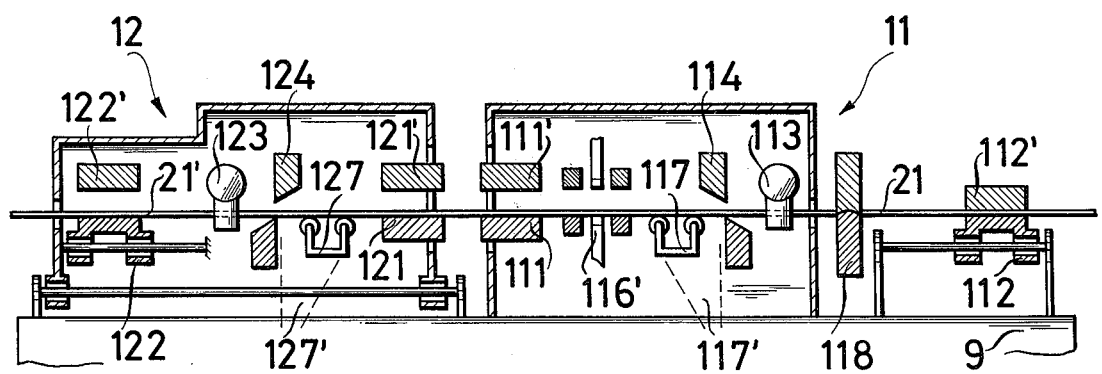

The movement of the welded bands 21 into position for the removal of the flash is accomplished by the band transfer arrangement 112 of the clamping frame 11, as is also the further movement into the position for the removal of the projection in the flow of the flash at the band edges (FIG. 2g).

I claim:

1. In a flash-butt welding machine for connecting the ends of bands following one another, which includes a stationary clamping frame and an upset platen mounted for movement in the direction of travel of the bands, and which machine includes band transfer arragments, means for laterally centering the bands, for gripping the centered bands, for cutting off the bands ends, for positioning the straightened and cut off bands opposite one another, for welding together the ends of the bands and for removal of the flash, the improvement in which the means for cutting off the band ends comprises squaring shears for each of the bands between the band transfer arrangements and the gripping means, said shears being associated with the clamping frame and carried by the upset platen respectively.

2. In a machine as claimed in claim 1, means carried by the clamping frame and the upset platen between the gripping jaws and the cutting means constituting a movable stop for the bands.

3. In a machine as claimed in claim 2, the stop means including a roll frame member movable between a position in which it lies outside the path of the band and a position in which it lies in the path of the band.

4. In a machine as claimed in claim 1, the lateral centering arrangements being positioned between the band transfer arrangements and the squaring shears.

5. In a machine as claimed in claim 1, the lateral centering arrangements being arranged in the neighborhood of the squaring shears.

6. In a machine as claimed in claim 1, the means for the removal of flash comprising a knife carried by the clamping frame between the clamping jaws and the squaring shears.

7. In a machine as claimed in claim 1, in which the squaring shears are hammer shears.

8. In a machine as claimed in claim 1, in which the squaring shears are removable from the clamping frame and the upset platen.

9. In a machine for flash-butt welding for connecting the ends of bands following one another, a stationary clamping frame, an upset platen movable towards and from the clamping frame in the direction of travel of the bands, clamping members movable towards and from each other transversely of the path of the band carried by the clamping frame and the upset platen at their adjacent ends, transfer means including clamping jaws carried by the upset platen and movable thereon in the direction of movement of the band and further jaws movable towards and from each other and movable in the direction of movement of the band at the opposite side of the clamping frame from the upset platen, squaring shears for cutting off the ends of the bands carried by the clamping frame and the upset platen between the transfer means and the clamping members.

10. In a machine as claimed in claim 9, stop means movable into the path of the bands at positions at a point of movement of the bands beyond the shear means.

* * * * *